Figure 1:
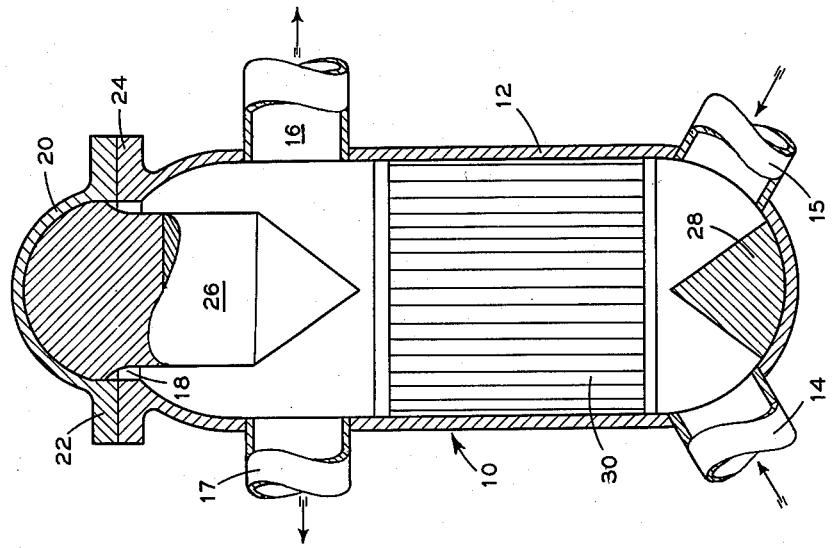

July 11, 1961 M. C. EDLUND ET AL 2,992,174
BREEDER-CONVERTER REACTOR
Filed Sept. 27, 1955 2 Sheets-Sheet 1

INVENTORS
Milton C. Edlund
Donald Kallman
BY
*J. P. Moran*
ATTORNEY

July 11, 1961   M. C. EDLUND ET AL   2,992,174
BREEDER-CONVERTER REACTOR
Filed Sept. 27, 1955   2 Sheets-Sheet 2

INVENTOR.
Milton C. Edlund
Donald Kallman
BY
ATTORNEY

United States Patent Office 2,992,174
Patented July 11, 1961

2,992,174
BREEDER-CONVERTER REACTOR
Milton C. Edlund, Lynchburg, Va., and Donald Kallman, New York, N.Y., assignors to The Babcock & Wilcox Company, New York, N.Y., a corporation of New Jersey
Filed Sept. 27, 1955, Ser. No. 536,916
2 Claims. (Cl. 204—193.2)

This invention relates in general to a nuclear reactor and more specifically, it relates to an improved breeder-converter reactor and a method of operating the same.

Some nuclear reactors used for the production of power have commonly been of the heterogeneous pressurized light water type. In these reactors the fuel is in a solid form and arranged in a geometric pattern capable of producing fission while the pressurized light water flows through the fuel elements in a multiplicity of fuel passages to cool the fuel and moderate the neutrons. Usually, the fuel in this type of unit is uranium isotope 238 ($U_{238}$), enriched with a large percentage of uranium isotopes 235 ($U_{235}$). In this unit, $U_{235}$ fissions and it gives up approximately 2.5 neutrons and large quantities of heat. The heat is carried away by the light water coolant with one neutron going to sustain the chain reaction and the remaining one and one half neutrons being lost to the system. Also during this process some of the non-fissionable uranium 238 captures a percentage of the neutrons and is converted ultimately to fissionable plutonium ($Pu_{239}$). Usually, however, in this system the gain in plutonium is much less than the quantity of $U_{235}$ burned.

The present invention provides apparatus and a method of operating a breeder-converter reactor in which there is made an amount of fissionable material approximately equal to the amount of fissionable material burned in the process. Accordingly, the invention comprises a breeder-converter reactor having a generally cylindrically shaped core and breeding blanket. In the core there are a multiplicity of removable fissile fuel plate assemblies and a plurality of removable fertile material plate assemblies so arranged that each fertile material assembly is surrounded throughout its length by fuel plate assemblies. The assemblies are constructed in the same size and shape so as to be interchangeable. There is a breeding blanket longitudinally surrounding the cylindrically shaped core and the blanket is composed of vertically elongated rectangularly shaped plate assemblies. The reactor is operated so that the centrally disposed fuel in the core burns at a greater rate than the peripherally disposed portions. The reactor is refueled by moving the peripherally disposed fuel assemblies towards the center of the core as the depleted center fuel assemblies are removed for disposal. The new fuel plate assemblies are always loaded into the peripheral portions of the core.

The various features of novelty which characterize our invention are pointed out with particularity in the claims annexed to and forming a part of this specification. For a better understanding of the invention, its operating advantages and specific objects attained by its use reference should be had to the accompanying drawing and descriptive matter in which we have illustrated and described a preferred embodiment of our invention.

Figure 2:
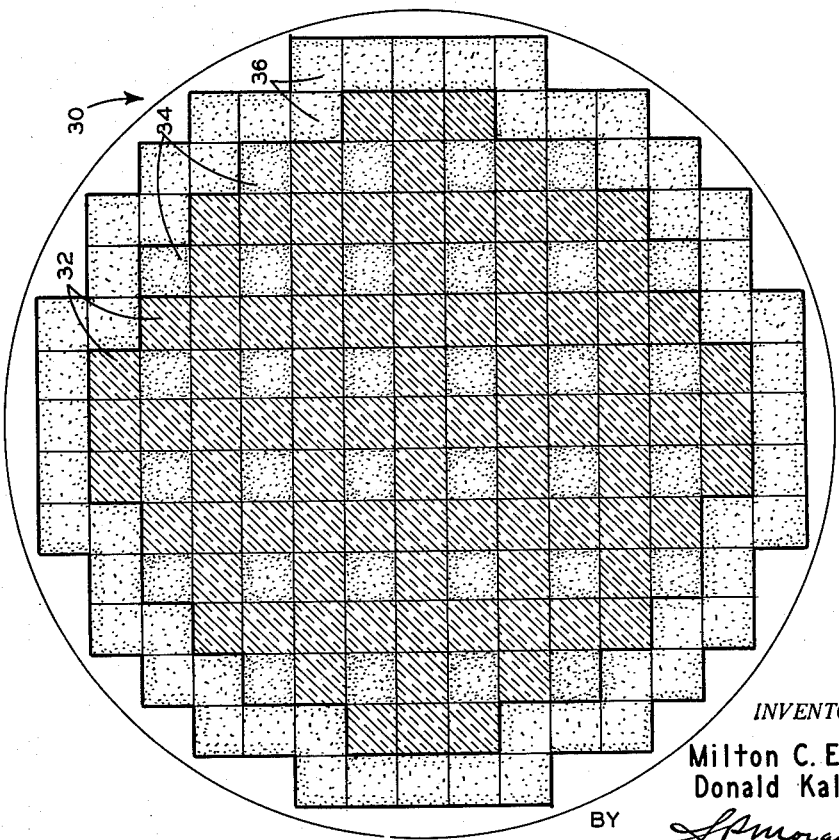
Figure 4:
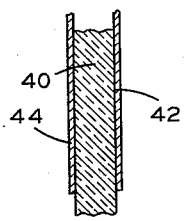
Figure 5:
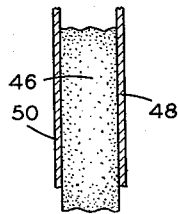
Figure 6:
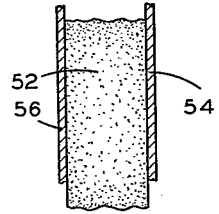
Figure 3:
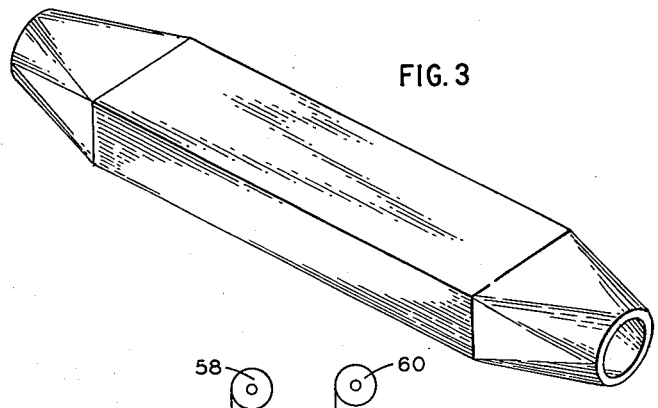
Figure 7:
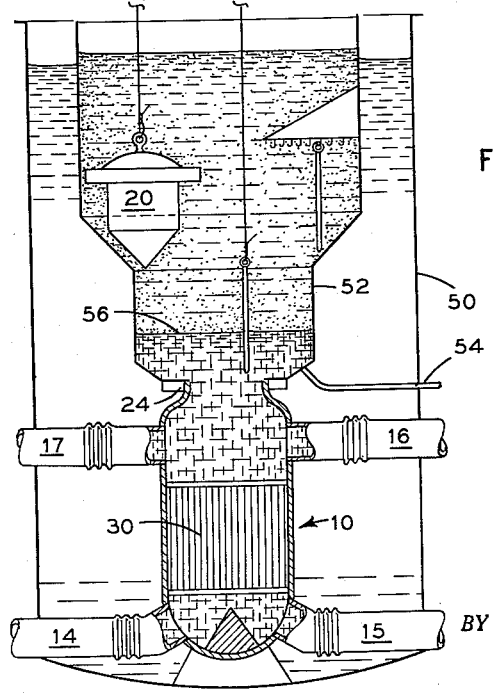

Of the drawings:

FIG. 1 is a vertical section through the reactor of the invention;
FIG. 2 is a horizontal section through the core and blanket of the reactor;
FIG. 3 is a perspective view of a typical fuel plate and fertile material plate assembly;
FIG. 4 is a section showing the fissile material fuel plate;
FIG. 5 is a section showing the core disposed fertile material plate;
FIG. 6 is a section showing the blanket fertile material plate; and
FIG. 7 is a vertical section through the apparatus, including the reactor containment tank showing the loading and unloading operation of the reactor.

The reactor 10 has an elongated pressure vessel 12 having coolant inlets 14 and 15 and coolant outlets 16 and 17 and a fuel access opening 18 in the upper portion thereof. Arranged at the opening there is a flanged closure member 20 with a flange 22 to match with the reactor flange 24 to secure a leak-tight joint. Interiorly attached to the closure member there is a filler plug 26 used to reduce the quantity of coolant fluid required. In the lower portion of the pressure vessel there is another filler plug 28. Disposed centrally of the reactor vessel there is the reactor core and blanket 30.

The core and the blanket is arranged generally in the shape of a right circular cylinder having a length to diameter ratio of approximately 1½. The core is composed of a large number of fuel plate assemblies 32 and fertile material plate assemblies 34, 36 arranged in adjoining relationship to form the generally cylindrically shaped core and blanket. Each plate assembly as shown in FIG. 3 comprises a multiplicity of thin plates of either fuel or fertile material and the bundle is put together so that it is a long slender assembly of square cross section (FIG. 3). For instance, in the present embodiment, the plate assemblies are six inches square and six feet long. Each assembly is constructed to the same dimensions so that they are interchangeable with each other, whether that assembly is fuel or fertile material.

FIG. 4 is an enlarged section through one of the plates of the fuel assembly in which the fissile fuel 40 is clad on its sides by corrosion resistant plates 42, 44. The fissionable material contemplated by the present invention is uranium 238 fully enriched with uranium 235 and after the reactor has operated for some period of time will comprise thorium fully enriched with uranium 233.

In FIG. 5 there is shown a typical enlarged section of a fertile material plate in which the fertile material 46 is thorium and cladded by corrosion resistant materials 48 and 50, such as zirconium or stainless steel. It can be seen that this element is of a larger thickness than the fuel plate of FIG. 4 and this is the type of plate which would be put into the fertile material assemblies which are dispersed throughout the core of the reactor.

In FIG. 6 there is shown a fertile material plate in which the thorium 52 is covered by corrosion resistant materials 54, 56 of either stainless steel or zirconium. In this case the fertile material plate is thicker than that shown in FIG. 5 because on the blanket the material will generate less heat and can be more readily cooled at this thickness.

Table 1 shows a neutron balance chart which illustrates the specific embodiment of this invention compared to a pressurized light water uranium 235 reactor.

Table I

|  | Light Water U 235 | Heavy Water U 235 Core and Thorium Blanket | Heavy Water U 233 Core and Thorium Blanket |
| --- | --- | --- | --- |
| Neutron production, neutrons/fission | 2.46 | 2.46 | 2.54 |
| Capture by fuel without fission | .38 | .38 | .23 |
| Coolant and structure loss and leakage | .25 | .02 | .02 |
| Absorption by fission products | .15 | .23 | .23 |
| Required for maintaining fission | 1.00 | 1.00 | 1.00 |
| Conversion ratio | .68 | 0.83 | 1.06 |

This table shows that if a thorium blanket is used in connection with a fissionable fuel that the conversion rate from fertile material to fissionable material increases materially over that of the light water pressurized reactor. The left hand column illustrates what happens to the neutrons produced in the fully enriched $U_{235}$ light water system of a conventional arrangement in which there is no blanket. The center column is the balance for a pressurized heavy water $U_{235}$ reactor having fertile material dispersed throughout the core and in a blanket. The right hand column shows the balance when the reactor of the present embodiment is using $U_{233}$ as the fuel and is cooled by heavy water with fertile material in the core and in the blanket. It should be noted that by using the heavy water the amount of liquid and structural loss drops from .25 neutrons in the light water system to .02 neutrons. Further, it should be recognized that in the $U_{233}$ system there is a greater production of neutrons per fission than with $U_{235}$.

Accordingly, the reactor of the invention is first operated with the fuel being $U_{238}$ enriched with $U_{235}$ and the fertile material being thorium. The reactor core is then arranged so that there is a sufficient number of fuel assemblies in the central portion of the core to cause fission and approximately as shown in FIG. 2. Disposed at spaced intervals in the core are a number of fertile material or thorium plate assemblies 34 and each is longitudinally surrounded by fuel assemblies in the central portion of the core, while at the outside of the core some of the thorium elements have only two sides adjacent the fuel elements. On the outer peripheral portion of the generally cylindrically shaped core there is disposed a plurality of thorium plate assemblies circumferentially completely surrounding the core. These thorium elements are collectively called a blanket.

As the neutron flux is greater at the center of the reactor core than at the sides, with this arrangement the central fuel elements will burn up at a greater rate than those towards the periphery. Thus when the unit is to be refueled the depleted fuel is removed from the central portion of the core, the outer fuel is then shifted to the center and the new fuel assemblies are placed only at the outer side of the core. All of this shifting can be accomplished because the assemblies are arranged to be interchangeably positioned. Thus a brand new fuel element can be started on the outside where the neutron flux is low, and, as the fissile material content decreases it can be relocated in a more central position where the neutron flux is high. This sequential fuel burning operation allows the fuel to be efficiently utilized over a longer period of operation and gives a greater allowable burn-up of fuel. The rate at which the unit is to be refueled is determined by the rate of fuel burn-up in the central portion of the core. However, as new elements are placed in service they will always be placed in the outer or circumferential portions of the core.

As the reactor operates, burning $U_{235}$, it converts the thorium to $U_{233}$ at a rate of .83 lbs. per pound of $U_{235}$ burned. The thorium plates will be processed to recover the $U_{233}$. As increasing amounts of $U_{233}$ become available the reactor will be operated as a breeder with a conversion rate of 1.06 pounds of $U_{233}$ made per pound of $U_{233}$ burned.

The fertile material or thorium plate assemblies can also be programmed so as to be moved at each fueling operation so as to improve the quantity of converted material per assembly in response to the neutron flux to which it is exposed.

In FIG. 7 there is shown the reactor 10 disposed in the lower portion of a reactor containment tank 50. Attached to the lower flange 24 of the reactor there is a reactor fueling shield tank 52 arranged more or less in the shape of a funnel. This tank is ordinarily filled with light water during the reactor operation, during which time it would act as a shield. However, when the reactor is to be refueled the light water is drained by the line 54 and a small amount of heavy water passed through that line into the lower portion of the tank to cover the top of the reactor up to the level 56. A remote loading apparatus, indicated by the top winches 58 and 60, is located above the unloading shield tank 52 and is arranged so that it can remove the fuel elements from the core and blanket 30. The tank is then filled with a clear fluid immiscible with water, such as diphenyl and liquid silicones. This material will act as a shielding agent so that the operators of the refueling apparatus may operate over the open mouth of the reactor without being exposed to dangerous amounts of radiation. Thus using the refueling apparatus, the fuel and fertile material plate assemblies may be shifted and changed without exposing the operators to radiation and while maintaining the quantity of heavy water necessary to the refueling operation to a very limited amount. When the fuel element reshifting has been completed the closure is replaced, the heavy water outside of the reactor is drained and recovered. Then the clear fluid is removed to await the next refueling operation.

While in accordance with the provisions of the statutes we have illustrated and described herein a specific form of the invention now known to me, those skilled in the art will understand that changes may be made in the form of the apparatus disclosed without departing from the spirit of the invention covered by our claims, and that certain features of the invention may sometimes be used to advantage without a corresponding use of the other features.

What is claimed is:

1. In a breeder converter-reactor, a generally cylindrically shaped core and breeding blanket comprising a plurality of removable fertile material plate assemblies, a plurality of removable fissile fuel plate assemblies, said core and blanket arranged to be cooled and moderated by pressurized water flowing through the passages of said plate assemblies, said assemblies arranged with each fertile material assembly uniformly arranged and longitudinally surrounded by fuel plate assemblies, each of said assemblies being of the same shape and size to be interchangeable with each other, and said fertile material blanket longitudinally surrounding the longitudinal portion of said cylindrically shaped core.

2. In a breeder converter reactor a generally cylindrically shaped core and breeding blanket comprising a plurality of removable fissile fuel plate assemblies, a plurality of removable fertile material plate assemblies, said core and blanket arranged to be cooled and moderated by pressurized water flowing through the passages of said plate assemblies, said assemblies arranged with each fertile material assembly uniformly arranged and longitudinally surrounded by fuel plate assemblies, each of said assemblies being of the same shape and size to be interchangeable with each other, said fertile material blanket longitudinally surrounding the longitudinal portion of said cylindrically shaped core, and said blanket being composed of a plurality of fertile material plate assemblies.

References Cited in the file of this patent

UNITED STATES PATENTS 2,708,656     Fermi et al. _____ May 17, 1955

OTHER REFERENCES

Unbehaun: History and Status of the E.B.R., AECD-3712, April 15, 1953.

Principles of Nuclear Reactor Engineering, by Samuel Gladstone, D. Van Nostrand Co., N.Y., July 1955, pps. 834–837.

Proceedings of the International Conference on the Peaceful Uses of Atomic Energy, held in Geneva, August 8–20, 1955, vol. 3, Power Reactors United Nations, N.Y., 1955, pps. 134–142, 211–218, 233, 234, 330–338, 341, 346, 347, 348, 349.